(12) United States Patent
Levy et al.

(10) Patent No.: US 12,229,120 B1
(45) Date of Patent: Feb. 18, 2025

(54) DATABASE VERSIONING BASED ON TRANSACTIONS

(71) Applicant: VAST DATA LTD., Tel Aviv (IL)

(72) Inventors: Asaf Levy, Tel Aviv (IL); Eyal Gordon, Tel Aviv (IL)

(73) Assignee: VAST DATA LTD., Tel Aviv (IL)

(*) Notice: Subject to any disclaimer, the term of this patent is extended or adjusted under 35 U.S.C. 154(b) by 0 days.

(21) Appl. No.: 18/457,316

(22) Filed: Aug. 28, 2023

(51) Int. Cl.
*G06F 7/00* (2006.01)
*G06F 16/21* (2019.01)
*G06F 16/23* (2019.01)
*G06F 17/00* (2019.01)

(52) U.S. Cl.
CPC ........ *G06F 16/2379* (2019.01); *G06F 16/219* (2019.01)

(58) Field of Classification Search
None
See application file for complete search history.

(56) References Cited

U.S. PATENT DOCUMENTS

| | | | |
|---|---|---|---|
| 11,392,557 B1* | 7/2022 | Fuller | G06F 16/2358 |
| 2018/0129693 A1* | 5/2018 | Chatterjee | G06F 16/2329 |
| 2023/0205758 A1* | 6/2023 | Gordon | G06F 16/2379 |
| | | | 707/703 |

* cited by examiner

*Primary Examiner* — Tuan A Pham
(74) *Attorney, Agent, or Firm* — Reches Patents

(57) ABSTRACT

A method for accessing a database that is stored in a storage system, the method includes: (a) receiving a request to obtain a database entity (DE) of a requested version line out of multiple version lines that differ from each other by one or more transactions; (b) obtaining, for each DE portion out of multiple DE portions of the DE, content of the DE portion as written during a transaction of the requested version line that was a last transaction of the requested version line that wrote the DE portion to the database; wherein the obtaining includes (i) using first metadata that is indicative of transactions of the requested version line, and (ii) using second metadata that is indicative of which transactions were involved in writing to a logical address range that is associated with the DE portion; and (d) sending a response to the request, wherein the response comprises, for each DE portion of the DE portions, the obtained content.

20 Claims, 5 Drawing Sheets

---

Receiving a request to obtain a database entity (DE) of a requested version line out of multiple version lines that differ from each other by one or more transactions. 410

Obtaining, for each DE portion out of multiple DE portions of the DE, content of the DE portion as written during a transaction of the requested version line that was a last transaction of the requested version line that wrote the DE portion to the database. 420

Sending a response to the request, wherein the response includes, for each DE portion of the DE portions, the obtained content. 430

400

DATABASE VERSIONING BASED ON TRANSACTIONS

BACKGROUND

A database transaction is a batch of work that contains one or more operations, each reading and/or writing information to the database.

A version control tool can be employed for the database to keep track of all the changes made by different users and/or developers, allowing to properly view, track and manage all the modifications done to the database.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
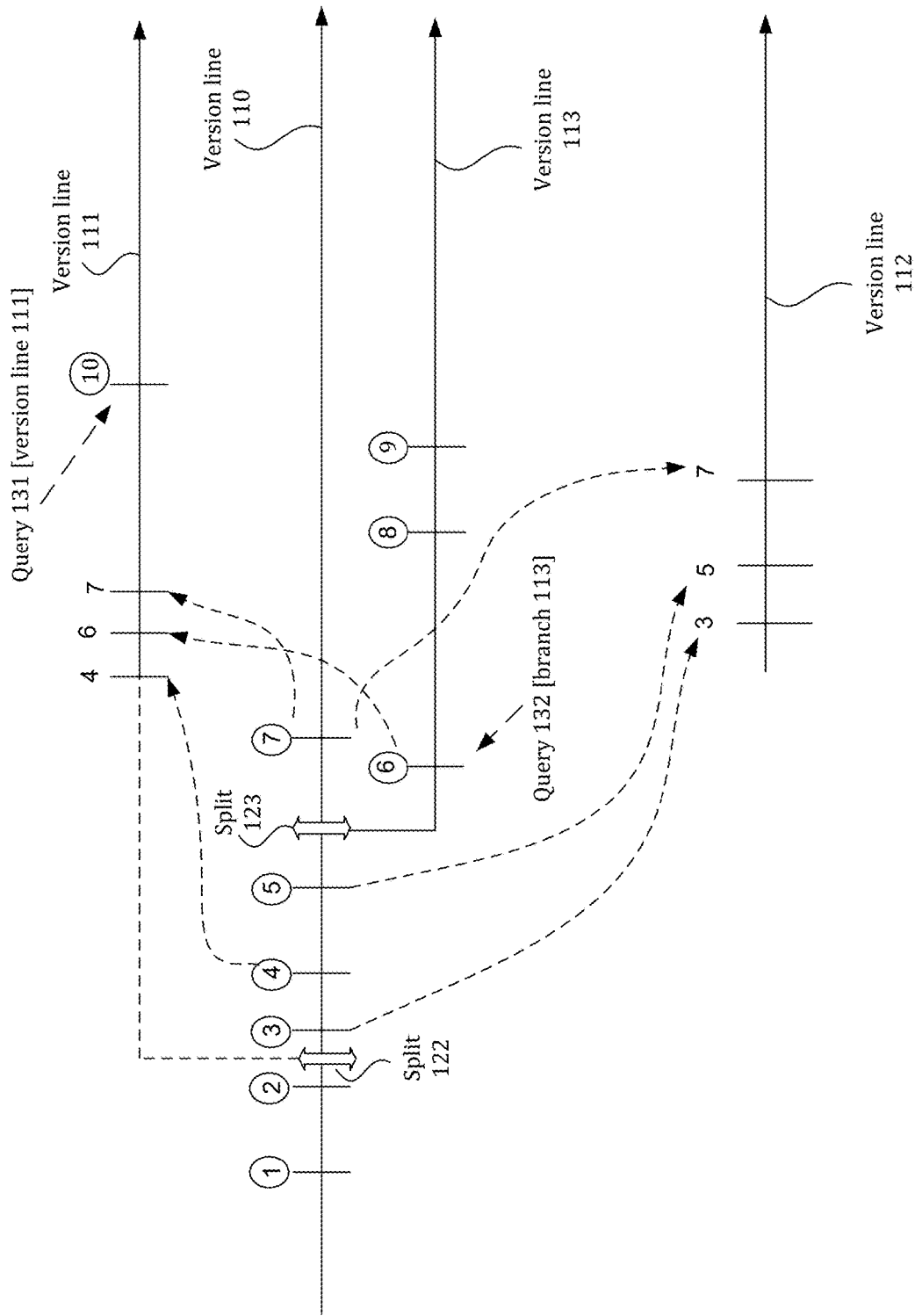
FIG. 1 is an example of versions lines and transactions.

Any reference to "may be" should also refer to "may not be".

In the following detailed description, numerous specific details are set forth in order to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

The database described herein enables a user to create transaction-based version lines that form parallel version lines of a database table, where the transactions that form a version line can be selected in a sequence that differs from the original sequence of the transactions that were historically performed on the database.

The database further enables the users to run queries on content under various version lines and to perform further transactions on top of various version lines, which will allow them to safely test and implement changes, and to manage different parallel version lines.

The database tables (or any other DB entity) are updated as part of performing transactions, wherein each transaction is assigned with a transaction identifier. The transaction identifiers stamp each table portion (cell, row, row portion, column, column portion) upon being written, to indicate the transaction that updated or created the content of this table portion.

A version line is defined as a list of transactions included in the version line. Each transaction typically writes to portions of the database. Content of portions that were not written by a certain transaction, is taken from content that was written by previous transactions of the version line, according to a reverse order of the transactions in the version line, i.e., the content that was written by the last transaction of the version line that wrote to the address of the portion.

The database starts its existence with a single (main) version line, and every transaction being performed is applied to the main version line by default, i.e., when there is only one version line, or when the query does not specify a specific version line.

Version lines can be either split (branched) from the main version line, or may be completely parallel to the main version line. Further new version lines can be created from version lines that were split from the main or other version lines. Version lines can also be merged back into the main version line or into the original version line from which they were split.

When querying the data of a table from the view of a specific version line, the table portions that are relevant are those that are stamped with transaction identifiers included in the version line, where the relevant content of the table portion is selected according to the reverse order of the transactions defined by the version.

A version line can be updated by moving transactions into and out of a version line. Version line can also be merged. Merging version lines may result in conflicts that need to be resolved by rules. For example, a basic rule may be that the newer transaction wins. Another rule defines that updates on rows, columns or tables that were deleted by a past transaction will be ignored.

Each version line is associated with a list of transactions that belong to the version line. When the version line is created, the initial list of transactions is defined for the version line. The creation of version lines may be requested by a user of the database system.

The response to a transaction that was requested by the user may include a transaction identifier, so that the user will be able to correlate a transaction identifier to the operations of the query, so that this transaction identifier can be later selected to be included in a version line that is different from the version line on which the transaction was performed. The database system may provide a list of at least part of the transaction identifiers and a summary of the transaction commands for each transaction identifier, so that the user will be able to select specific transaction identifiers for adding to another version line.

An incoming query may indicate the addressed version line, and the transaction executed in response to the query will be added to the transaction list of the version line.

FIG. 1 illustrates version lines of a database table. A main version line 110 (or the default version line) may be the only version line that exists at the beginning of the table's life cycle. At this stage, each transaction being performed on the database table is part of the main version line, for example, transactions 1-5 were performed when main version line 110 was the only version line. Although FIG. 1 refers to a database table, the solution may be implemented for any database entity of any kind, or an entire database.

Later on, some other version lines may be created, where new transactions are applied either to the main version line, such as transaction 7, or on the other version lines, according to the version line indicated in each query.

At some point, a new version line 113 is created with a split point 123, which identifies main version line 110 as the parent version line and transaction 5 as the latest transaction of version line 110 to be included in new version line 113. Therefore transactions 1-5 are included in version line 113, when it is created, in addition to their inclusion in version line 110. After the creation of version line 113, queries may indicate version line 113 as the target of the transactions to be executed in response to the query. For example, transactions 6, 8 and 9 are executed on version line 113, after its creation.

At some point, a version line 111 is created, branched from the main version line 110. The creation command may include: a split point 122 that identifies a point on the sequence of transactions that were applied on the parent version line (main version line 110). The split point 122 identifies: (i) the parent version line, in this case main version line 110, and (ii) the latest transaction on this version line that should be part of the version line 111, in this case, transaction 2, meaning that any transaction that is older or equal to transaction 2 in version line 110 is also included in the new version line 111. In addition to the split point that identifies a range of transactions, from the start of the parent version line up to the split point, a list of specific transactions can be identified, so as to be part of the new version line. These additional transactions do not need to be a sequential range of transactions, but also non-sequential selected transactions, and even transactions selected from different version lines. In this example, the following transactions are selected for the new version line 111: transaction 4 originated from parent version line 110, transaction 6 selected from version line 113 and transaction 7 selected from parent version line 110.

Circled reference numbers of transactions indicate transactions that were originally executed on the version line, for example, transactions 1-5 and 7 of version line 110, and transactions 6, 8 and 9 of version line 113. Non-Circled reference numbers of transactions indicate transactions taken from other version lines that are defined as applicable to the corresponding version line that adopts these transactions, for example, transactions 4, 6 and 7 of version line 111.

Version line 114 is created so as to skip earlier transactions that were performed on the main version line, and is created to include only specific transactions, e.g., transaction 3, 5, and 7.

After a version line is created, queries from users may identify the version line upon which they should be applied. Suppose transaction 10 is executed in response to a query 131 that identifies version line 111, then the identifier of transaction 10 is added to version line 111, upon execution.

Figure 2:
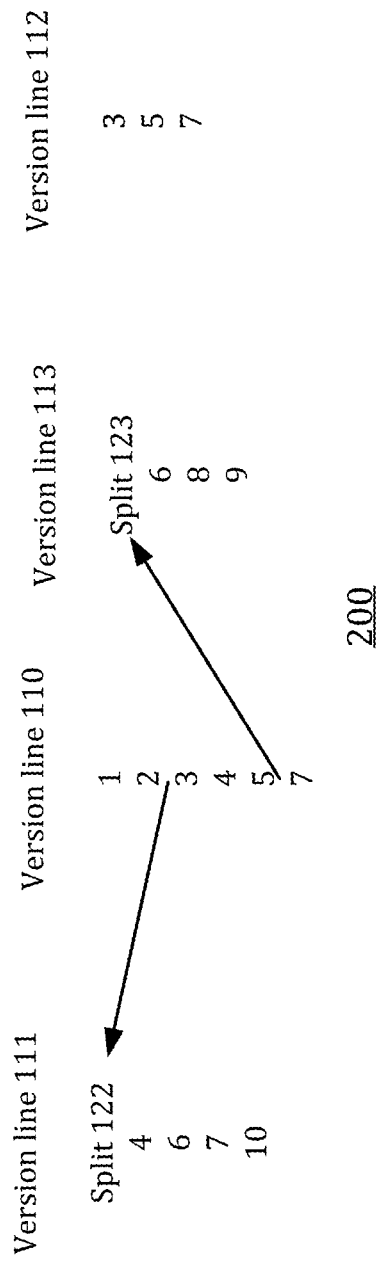
FIG. 2 is an example of a mapping between version lines to the transactions.

FIG. 2 illustrates a mapping 200 between version lines to the transactions that are included in these version lines. The mapping may be performed to enable obtaining of a list of transactions related to a certain version line, or to check an existence of a transaction in a version line. A transaction included in each version line may be either a transaction that was defined as included in the version line when the version line was created and/or transactions that were performed on data belonging to the version line in response to a query that specified the version line.

In this example, version line 110 includes transactions 1-5 and 7, in this order. Version line 111 includes transactions related to split point 122 which indicates all the transactions in version line 110 up to transaction 2, i.e., transactions 1 and 2, and further includes transactions 4, 6 and 7 that were specified upon creating or after the creation of the version line, and transaction 10 that was executed in response to a query addressing version line 111. Version line 113 includes transactions related to split point 123 which indicates all the transactions in version line 110 up to transaction 5, i.e., transactions 1-5, and further includes transactions 6, 8 and 9 that were executed in response to queries addressing version line 113. Version line 112 includes transactions 3, 5 and 7 that were selected for version line 112 upon or after its creation. The mapping of transactions to a version line, further indicates the order of the transactions in this version line, e.g., the order listed in FIG. 2.

Portions of a database table are associated with metadata, that maps logical address ranges within the table, into physical addresses where the data is stored. A logical address range of a portion can be mapped into multiple physical address ranges, wherein each physical address range stores content of the portion that was written by a different transaction. Therefore, each logical address range is also mapped into the transactions that wrote contents of the portion into the corresponding physical address ranges. A portion may be sequential cells that are part of a column, a row, a single cell, etc., and mapped by a logical address range that corresponds to the location or offset in the table. According to embodiments of the invention, each logical address range to transactions mapping (LARTM) segment includes the transaction identifier of the transaction that updated the content of the portion, wherein the content that was updated by the transaction is pointed by a physical address range associated with the transaction.

In response to a read query addressed to a certain table portion, wherein the read query identifies a requested version line, the read request is responded with the content of the portion that was written by the latest transaction listed in the version line, among other contents of this portion that were written by transactions that precedes the latest transaction in the requested version line, while ignoring transactions that are not part of the version line.

According to a first embodiment, a responding to the read request can include: evaluating all the contents: (i) stored for the certain portion; (ii) stamped with transaction identifiers (that wrote the contents) that are included in the version line. Then—selecting the content that is stamped with a most recent transaction identifier according to the order of transactions in the version line.

According to a second embodiment, a responding to the read request can implement the following steps: (i) identifying the transactions related to the requested version line and the order defined to these transactions in the version line; (ii) checking whether there is content related to the portion that is stamped with the latest transaction of this version line, if not-continuing iterating the list of transactions of the version line, in a reverse order of the order defined for the version line, and checking whether there is content related to the portion that is stamped with the iterated transaction; (iii) the first content, encountered for the portion when iterating the list of transactions in a reverse order—is returned as a response to reading the content of the portion.

Figure 3:
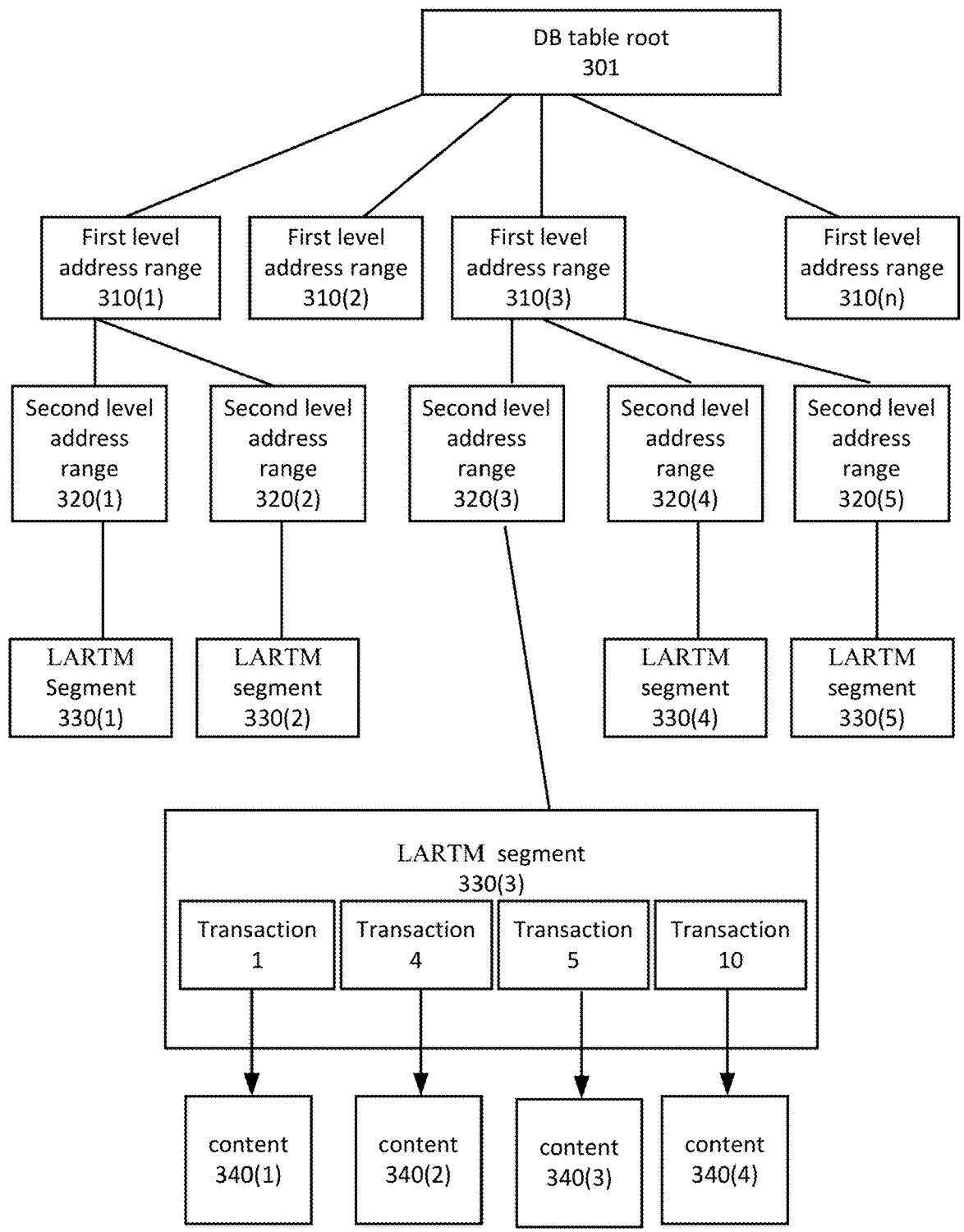
FIG. 3 illustrates an example of a table metadata structure.

FIG. 3 illustrates a table metadata structure for mapping portions of the table, into physical locations where the contents of the portions are stored.

In FIG. 3, the table metadata structure 300 is illustrated as a tree that includes DB table root 301 that points to first level nodes 310(1)-310(n) mapping a first level logical address ranges into lower layers. Each first level node may point to one or more second level nodes that map second level logical address ranges. The logical address ranges are related to portions of the database table, e.g., cells, column portions, rows, a range of rows, etc.

There may be more than first and second levels of logical address ranges splitting the ranges into smaller address ranges in each subsequent level. The second level nodes may be mapped into metadata of table portions, also referred to as logical address range to transactions mapping (LARTM) segments, for example, second level node 320(3) is mapped to one or more LARTM segments, such as LARTM segment 330(3). FIG. 3 also illustrates that second level nodes 320(1), 320(2), 320(4) and 320(5) are mapped to portions metadata 330(1), 330(2), 330(4) and 330(5), respectively Each LARTM segment may include information of one or more transactions that updated a DB entity (DE) portion. For example, a certain table portion, described by LARTM segment 330(3), was written by transactions 1, 4, 5 and 10, and includes transaction metadata for each of these writes. The transaction metadata includes references (e.g., pointers) to the storage locations (e.g., physical address ranges) where the contents, written by these transactions, are stored. Other transactions illustrated by FIGS. 1 and 2 did not change the content of the certain portion described by LARTM segment 330(3).

Each transaction metadata of the certain portion may include one or more pointers to the stored content, e.g., physical address ranges where the contents, written by these transactions, are stored. For example—the metadata of transaction 1 points to content 340(1), the metadata of transaction 4 points to content 340(2), the metadata of transaction 5 points to content 340(3), and the metadata of transaction 10 points to content 340(4).

When the certain portion is being read by a query that is executed on a certain transaction, e.g., version line 111, the list of transactions of version line 111 may be obtained. The list includes the transactions: 4, 6, 7 and 10 and older transactions related to split point 122. The location of the LARTM segment of the certain portion is searched in tree 300, and once found—the LARTM segment is searched for existence of content related to transactions in the list of transactions, starting from the last transaction in the list and proceeding backwards in the list. In this case, the last transaction is transaction 10, that points to the storage location of content 340(4) that is associated with transaction 10 for this portion. Therefore, the response for reading the certain portion includes the content related to transaction 10. Alternatively, each LARTM segment can be checked for the transaction identifier related to the transaction that wrote the portion content, and the transaction identifier is looked up in the transactions that compose version line 111. The most recent transaction among them, according to the order (reverse order) of the transactions in the list, is selected, and the content pointed by this transaction metadata is used for responding to the query of reading the certain portion.

Suppose the certain portion is being read by a query that is executed on version line 113, the list of transactions of version line 113 is obtained. The list includes the transactions: 6, 8 and 9, as well as transactions indicated by the split point 123, i.e., transactions 1-5. The LARTM segment is searched for existence of content related to the list of transactions, starting from the last transaction in the list and proceeding backwards in the list. In this case, the list of transactions is checked starting from the last transaction 9 and proceeding to previous transactions 8 and then 6. No metadata is found for transaction 9, 8 and 6. The checking proceeds to further previous transactions indicated by the split point and owned by another version line 110. The previous versions are 5 down to 1. When checking for existence of metadata for transaction 5—there is transaction metadata pointing to content 340(3), which is used for responding to the query.

In a similar manner, when the certain portion is being read by a query that is executed on version line 112 or 110, the returned content is 340(3) corresponding to transaction 5.

Figure 4:
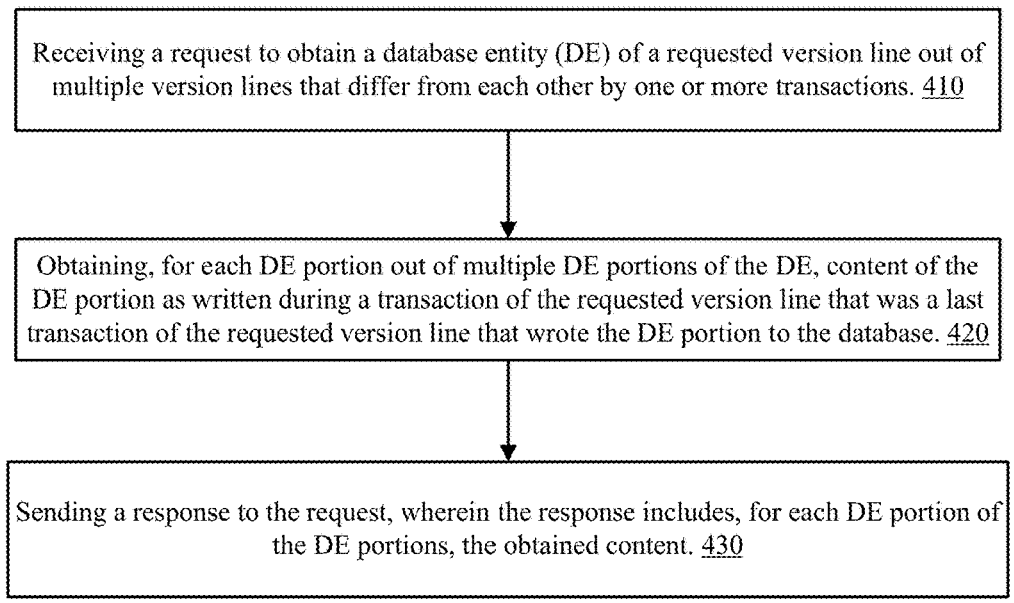
FIG. 4 illustrates an example of a method.

FIG. 4 illustrates an example of method 400 for accessing a database that is stored in a storage system.

According to an embodiment, method 400 starts by step 410 of receiving a request to obtain a database entity (DE) of a requested version line out of multiple version lines that differ from each other by one or more transactions. The DE may be a part of a database, e.g., a table, one or more rows, one or more columns, one or more cells, or a filtered part of the above.

According to an embodiment, step 410 is followed by step 420 of obtaining, for each DE portion out of multiple DE portions of the DE, content of the DE portion as written during a transaction of the requested version line that was a last transaction of the requested version line that wrote the DE portion to the database. For example, transaction 5 is the last transaction of version line 112 that wrote to the DE portion represented by LARTM segment 330(3). Transaction 7 of version line 112 is the last transaction in version line 112 and therefore is newer than transaction 5, but transaction 7 did not write content to this DE portion. The DE portion may be the portion or the table portion that were described hereinabove.

Step 420 includes using first metadata and using second metadata.

The first metadata is indicative of transactions of the requested version line and their order within the requested version line. Mapping 200 of FIG. 2 is an example of the first metadata.

The second metadata is indicative of which transactions were involved in writing to a logical address range that is associated with the DE portion. LARTM segments 330(1)-330 (5) are an example of the second metadata of a DE portion. Other portions may be associated with other second layer nodes 320(1), 320(2), 320(4) and 320(5).

According to an embodiment, step 420 is followed by step 430 of sending a response to the request, wherein the response includes, for each DE portion of the DE portions, the obtained content. The content is obtained by the metadata of the transaction of the requested version line that was a last transaction of the requested version line that wrote the DE portion to the database.

The second metadata is indifferent to an allocation of transactions to version lines—in the sense that the second metadata includes a list of transactions that wrote to the logical address range that is associated with the DE portion-even if the transaction that wrote to the logical address range that is associated with the DE portion belong to different version lines. Furthermore, there may not be an indication about the version line of each transaction in the second metadata, because a single transaction may belong to multiple version lines. For example—the transactions of the second metadata may include a first transaction that belongs to a first version line and a second transaction that belongs to a second version line that differs from the first version line. Referring to FIG. 3—illustrating that LARTM segment 330(3) lists transactions 1, 4, 5 and 10—while mapping 200 illustrates that transaction 10 belongs to version line 111 while transaction 4 belongs to version line 110 and also belongs to version line 111. Some of the version lines may share some of the transactions, while another transaction may belong exclusively to one version line.

The requested version line may be any one of the multiple version lines—for example, referring to FIG. 1, the requested version line may be the main version line 110 or parallel version line 112 (not branched from the main version line) or any one of branched version lines 111 and 113.

It should be noted that a search for a DE portion takes into account the first metadata and the second metadata.

The first metadata may be accessed to provide first candidate transactions that are relevant to the requested version line. For example—assuming that the requested version line is 111—then the first candidate transactions include transaction 1 (precedes split 122), transaction 2 (precedes split 122), and transactions 4, 6, 7 and 10 that follow split 122.

Assuming that the DE portion resides in second level address range 320(3) the relevant LARTM segment 330(3) lists transactions 1, 4, 5 and 10 that wrote to the second level address range 320(3)—which form the second candidate transactions.

In order to determine which transactions of the requested version line wrote to the second level address range 320 (3)—an intersection between the list of first candidate transactions (1, 2, 4, 6, 7 and 10) and the list of second candidate transactions (1, 4, 5, and 10) should be calculated—to provide relevant transactions 1, 4 and 10. An example of intersecting between the lists of first and second candidate transactions: the first metadata can be queried for the requested version line and the transactions (second candidate transactions) written in the LARTM segment 330(3). The result of querying the first metadata are the transactions that intersect. For example, the first metadata can be queried for transaction line 111 and transactions 1, 4, 5 and 10 that are applicable to the DE portion, and the result will be 1, 4 and 10. Other intersection algorithms may be applied as well, as was described hereinbefore.

The last transaction of the relevant transactions is transaction 10—thus the last transaction of the requested version line that wrote the DE portion to the database is transaction 10—and the content of the DE portion that was written by transaction 10 is the required content of DE portion.

As illustrated in FIG. 3—the LARTM segments store the physical addresses in which the required content is stored.

Figure 5:
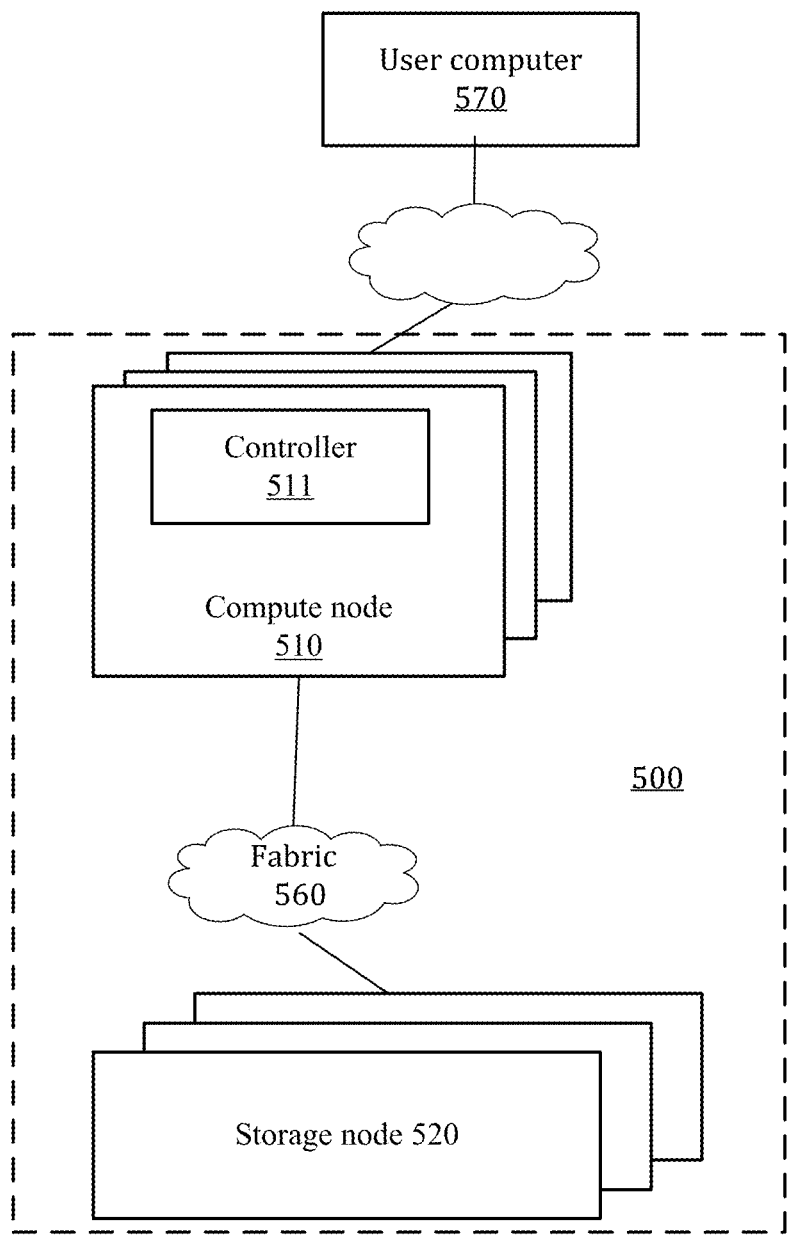
FIG. 5 illustrates an example of a storage system.

FIG. 5 illustrates an example of a storage system 500. The storage system 500 includes one or more compute nodes 510. Each compute node 510 includes multiple compute cores, where each compute core can be a processing circuitry, a part of processing circuitry, a controller 511 (hardware controller) and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

The storage system 500 also includes one or more storage nodes 420, wherein each storage node includes storage devices for storing data, The storage devices may be Solid State Drives (SSDs), NVRAM (non-volatile random-access memory) devices, etc. The storage devices may store the database, the first metadata and the second metadata and any of the data structures illustrated in FIGS. 2 and 3.

The computer nodes 510 and the storage nodes 520 are connected through a communication fabric 560 for accessing stored data. Multiple of the compute nodes or one of the compute nodes may execute method 400.

The compute nodes are connected to one or more user computers 570 that may access the database, and may further request creation of the version lines.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for accessing a database that is stored in a storage system,
the method comprises:
   (a) receiving a request to obtain a database entity (DE) of a requested version line out of multiple version lines, wherein each version line is defined, by a user of the storage system prior to the reciving, as a sequence of transactions selected from transactions that were performed on the database, wherein the multiple version lines differ from each other by one or more transactions;
   (b) obtaining, for each DE portion out of multiple DE portions of the DE, content of the DE portion as written during a transaction of the requested version line that was a last transaction, of the sequence of transactions of the requested version line, that wrote the DE portion to the database; wherein the obtaining comprises:
      i. obtaining the sequence of transactions of the requested version line, from a first metadata that is indicative of identifiers of transactions that belong to each of the multiple version lines, and
      ii. obtaining, from a second metadata that is indicative of which transactions were involved in writing to different logical address ranges of the database, the transactions that were involved in writing to a logical address range that is associated with the DE portion;
   (c) sending a response to the request, wherein the response comprises, for each DE portion of the DE portions, the obtained content.

2. The method according to claim 1, wherein the second metadata includes for each logical address range of the database, transactions identifiers of transactions of different versions lines.

3. The method according to claim 1, wherein the transactions of the second metadata comprise a first transaction that belongs to a first version line and a second transaction that belongs to a second version line that differs from the first version line.

4. The method according to claim 1, wherein the requested version line differs from a main version line of the multiple version lines.

5. The method according to claim 1, wherein the requested version line was split from a main version line of the multiple version lines, and is parallel to the main version line, starting from a split point in time.

6. The method according to claim 1, wherein the requested version line is parallel to a main version line of the multiple version lines and was not split from the main version line.

7. The method according to claim 1, wherein the obtaining for each DE portion comprises:
   determining, based on the first metadata, first candidate transactions that are relevant to the requested version line; and
   accessing the second metadata to find second candidate transactions that wrote to the logical address range associated with the DE portion.

8. The method according to claim 1, wherein the obtaining for each DE portion comprises:
   determining, based on the first metadata, first candidate transactions that are relevant to the requested version line;
   determining, for the logical address range associated with the DE portion, and based on the second metadata, second candidate transactions that wrote to the logical address range associated with the DE portion; and
   searching the last transaction of the requested version line that wrote the DE portion to the storage system out of transactions that are both a first candidate transaction and a second candidate transaction.

9. The method according to claim 1, wherein the second metadata belongs to a DE data structure that comprises layers that maps logical address ranges of different sizes to each other, wherein a plurality of logical address ranges of one or more of the layers are linked to a plurality of segments of the logical address ranges to transactions mapping.

10. The method according to claim 1, comprising accessing the content of the DE portion using physical address information of the second metadata.

11. A non-transitory computer readable medium for accessing a database that is stored in a storage system, the non-transitory computer readable medium stores instructions for:
 (a) receiving a request to obtain a database entity (DE) of a requested version line out of multiple version lines, wherein each version line is defined, by a user of the storage system prior to the receiving, as a sequence of transactions selected from transactions that were performed on the database, wherein the multiple version lines that differ from each other by one or more transactions;
 (b) obtaining, for each DE portion out of multiple DE portions of the DE, content of the DE portion as written during a transaction of the requested version line that was a last transaction, of the sequence of transactions of the requested version line that wrote the DE portion to the database; wherein the obtaining comprises:
  i. obtaining the sequence of transactions of the requested version line, from a first metadata that is indicative of identifiers of transactions that belong to each of the multiple version lines, and
  ii. obtaining, from a second metadata that is indicative of which transactions were involved in writing to different logical address ranges of the database, the transactions that were involved in writing to a logical address range that is associated with the DE portion;
 (c) sending a response to the request, wherein the response comprises, for each DE portion of the DE portions, the obtained content.

12. The non-transitory computer readable medium according to claim 11, wherein the second metadata includes for each logical address range of the database, transactions identifiers of transactions of different versions lines.

13. The non-transitory computer readable medium according to claim 11, wherein the transactions of the second metadata comprise a first transaction that belongs to a first version line and a second transaction that belongs to a second version line that differs from the first version line.

14. The non-transitory computer readable medium according to claim 11, wherein the requested version line differs from a main version line of the multiple version lines.

15. The non-transitory computer readable medium according to claim 11, wherein the requested version line was split from a main version line of the multiple version lines, and is parallel to the main version line, starting from a split point in time.

16. The non-transitory computer readable medium according to claim 11, wherein the requested version line is parallel to a main version line of the multiple version lines and was not split from the main version line.

17. The non-transitory computer readable medium according to claim 11, wherein the obtaining for each DE portion comprises:
 determining, based on the first metadata, first candidate transactions that are relevant to the requested version line; and
 accessing the second metadata to find second candidate transactions that wrote to the logical address range associated with the DE portion.

18. The non-transitory computer readable medium according to claim 11, wherein the obtaining for each DE portion comprises:
 determining, based on the first metadata, first candidate transactions that are relevant to the requested version line;
 determining, for the logical address range associated with the DE portion, and based on the second metadata, second candidate transactions that wrote to the logical address range associated with the DE portion; and
 searching the last transaction of the requested version line that wrote the DE portion to the storage system out of transactions that are both a first candidate transaction and a second candidate transaction.

19. The non-transitory computer readable medium according to claim 11, wherein the second metadata belongs to a DE data structure that comprises layers that maps logical address ranges of different sizes to each other, wherein a plurality of logical address ranges of one or more of the layers are linked to a plurality of segments of the logical address ranges to transactions mapping.

20. A storage system, comprising:
 a controller that is configured to:
 (a) receive a request to obtain a database entity (DE) of a requested version line out of multiple version lines, wherein each version line is defined, by a user of the storage system prior to the receiving, as a sequence of transactions selected from transactions that were performed on the database, wherein the multiple version lines that differ from each other by one or more transactions;
 (b) obtain, for each DE portion out of multiple DE portions of the DE, content of the DE portion as written during a transaction of the requested version line that was a last transaction, of the sequence of transactions of the requested version line that wrote the DE portion to the database; wherein the obtaining comprises:
  i. obtaining the sequence of transactions of the requested version line, from a first metadata that is indicative of identifiers of transactions that belong to each of the multiple version lines, and
  ii. obtaining, from a second metadata that is indicative of which transactions were involved in writing to different logical address ranges of the database, the transactions that were involved in writing to a logical address range that is associated with the DE portion; and
 (d) send a response to the request, wherein the response comprises, for each DE portion of the DE portions, the obtained content.

\* \* \* \* \*